US012304497B2

(12) United States Patent
Goto

(10) Patent No.: US 12,304,497 B2
(45) Date of Patent: May 20, 2025

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Takeru Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 18/203,110

(22) Filed: May 30, 2023

(65) Prior Publication Data
US 2023/0382396 A1 Nov. 30, 2023

(30) Foreign Application Priority Data

May 30, 2022 (JP) .................................. 2022-087540

(51) Int. Cl.
*B60W 40/08* (2012.01)
*G06V 20/59* (2022.01)
*G06V 40/18* (2022.01)

(52) U.S. Cl.
CPC ........... *B60W 40/08* (2013.01); *G06V 20/597* (2022.01); *G06V 40/18* (2022.01); *B60W 2420/403* (2013.01); *B60W 2540/225* (2020.02); *B60W 2556/10* (2020.02)

(58) Field of Classification Search
CPC ........... B60W 50/14; B60W 2554/402; B60W 2554/4026; B60W 2554/4029; B60W 2554/4041
See application file for complete search history.

(56) References Cited

U.S. PATENT DOCUMENTS 7,519,459 B2 * 4/2009 Ito ........................... A61B 5/18
348/148

FOREIGN PATENT DOCUMENTS

| CN | 112136094 A | * 12/2020 | ......... G02B 27/0093 |
| JP | 2021-033570 | 3/2021 | |
| KR | 20200145825 A | * 11/2019 | |

* cited by examiner

*Primary Examiner* — Quan Zhen Wang
*Assistant Examiner* — Mancil Littlejohn, Jr.
(74) *Attorney, Agent, or Firm* — Amin, Turocy & Watson, LLP

(57) ABSTRACT

Provided is a gaze estimation device for estimating toward which gaze candidate an occupant of a mobile object is directing his or her gaze from among a plurality of gaze candidates including gaze candidates existing on a structure of the mobile object and an object near the mobile object, the gaze estimation device being configured to: calculate, for each of the plurality of gaze candidates, a probability value of the occupant directing his or her gaze toward the gaze candidate based on the gaze and a probability distribution representing probabilities of directing his or her gaze toward each of the plurality of gaze candidates; and estimate that the occupant is directing his or her gaze toward a gaze candidate for which the probability value is equal to or larger than a threshold value among the plurality of gaze candidates.

5 Claims, 9 Drawing Sheets

DRIVING ASSISTANCE DEVICE, DRIVING ASSISTANCE METHOD, AND STORAGE MEDIUM

CROSS-REFERENCE TO RELATED APPLICATION

The application is based on Japanese Patent Application No. 2022-087540 filed on May 30, 2022, the content of which incorporated herein by reference.

BACKGROUND

Field of the Invention

The present invention relates to a driving assistance device, a driving assistance method, and a storage medium.

Description of Related Art

Hitherto, a technology for detecting the gaze of an occupant of a mobile object and assisting the occupant in driving the mobile object based on the detected gaze has been known. For example, Patent Publication No. 2021-33570 discloses a technology for restricting reception to a control panel of a mobile object when the mobile object is traveling and the detected gaze is not directed toward a predetermined area.

However, the related art cannot accurately detect the gaze of the occupant in consideration of the type of a gaze candidate toward which the occupant of the mobile object is directing his or her gaze.

SUMMARY

The present invention has been made in view of the above circumstances, and has an object to provide a driving assistance device, a driving assistance method, and a storage medium that are capable of accurately detecting the gaze of the occupant in consideration of the type of a gaze candidate toward which the occupant of the mobile object is directing his or her gaze.

The driving assistance device, the driving assistance method, and the storage medium according to the present invention adopt the following configuration.

(1): According to one aspect of the present invention, there is provided a gaze estimation device for estimating toward which gaze candidate an occupant of a mobile object is directing his or her gaze from among a plurality of gaze candidates including gaze candidates existing on a structure of the mobile object and an object near the mobile object, the gaze estimation device including a storage medium storing computer-readable commands and a processor connected to the storage medium, the processor executing the computer-readable commands to: calculate, for each of the plurality of gaze candidates, a probability value of the occupant directing his or her gaze toward the gaze candidate based on the gaze and a probability distribution representing probabilities of directing his or her gaze toward each of the plurality of gaze candidates; and estimate that the occupant is directing his or her gaze toward a gaze candidate for which the probability value is equal to or larger than a threshold value among the plurality of gaze candidates.

(2): In the aspect (1), the processor calculates the probability value based on the gaze, which is represented by polar coordinates centered around a head of the occupant of the mobile object, and a center angle and angle width of the gaze candidate represented by polar coordinates centered around the head.

(3): In the aspect (1), the processor repeatedly calculates the probability value at a plurality of time points, and calculates the probability value at a calculation time point based on the probability value at a previous time point and the probability distribution at the calculation time point.

(4): In the aspect (1), the processor calculates the probability value based on the different probability distributions set according to the types of the plurality of gaze candidates.

(5): According to another aspect of the present invention, there is provided a gaze estimation method for estimating toward which gaze candidate an occupant of a mobile object is directing his or her gaze from among a plurality of gaze candidates including gaze candidates existing on a structure of the mobile object and an object near the mobile object, the gaze estimation method causing a computer to: calculate, for each of the plurality of gaze candidates, a probability value of the occupant directing his or her gaze toward the gaze candidate based on the gaze and a probability distribution representing probabilities of directing his or her gaze toward each of the plurality of gaze candidates; and estimate that the occupant is directing his or her gaze toward a gaze candidate for which the probability value is equal to or larger than a threshold value among the plurality of gaze candidates.

(6): According to another aspect of the present invention, there is provided a non-transitory computer-readable storage medium storing a program for estimating toward which gaze candidate an occupant of a mobile object is directing his or her gaze from among a plurality of gaze candidates including gaze candidates existing on a structure of the mobile object and an object near the mobile object, the program causing a computer to: calculate, for each of the plurality of gaze candidates, a probability value of the occupant directing his or her gaze toward the gaze candidate based on the gaze and a probability distribution representing probabilities of directing his or her gaze toward each of the plurality of gaze candidates; and estimate that the occupant is directing his or her gaze toward a gaze candidate for which the probability value is equal to or larger than a threshold value among the plurality of gaze candidates.

According to the aspects (1) to (6), it is possible to accurately detect the gaze of the occupant in consideration of the type of a gaze candidate toward which the occupant of the mobile object directs his or her gaze.
flexibly execute driving assistance according to the direction or period of gaze of the occupant of a mobile object.

DESCRIPTION OF EMBODIMENTS

Now, a driving assistance device, a driving assistance method, and a storage medium according to an embodiment of the present invention are described with reference to the drawings.

[Overall Configuration]

Figure 1:
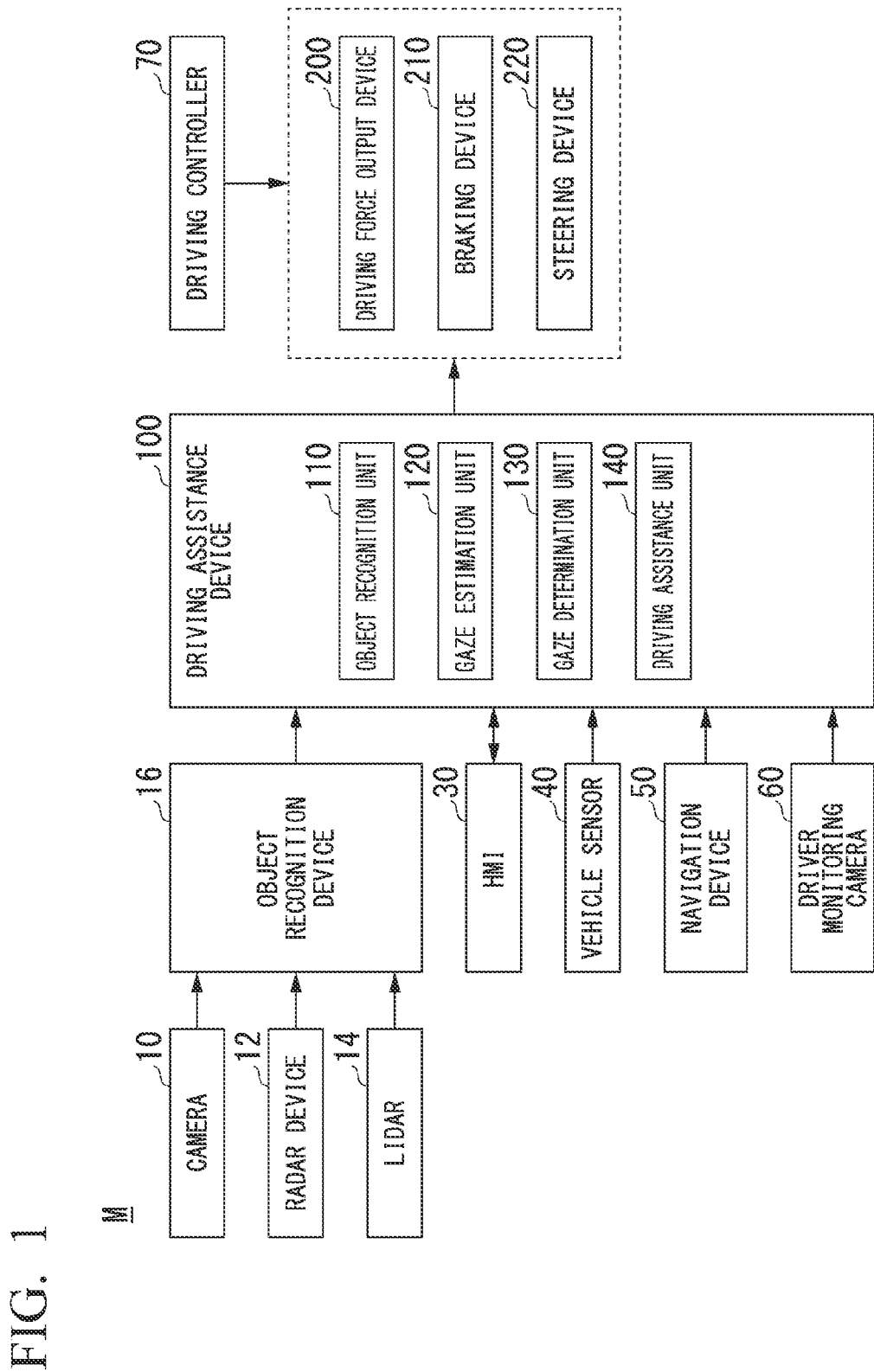
FIG. 1 is a configuration diagram illustrating a vehicle M including a driving assistance device according to an embodiment.

FIG. 1 is a configuration diagram illustrating a vehicle M including a driving assistance device 100 according to an embodiment. The vehicle M is, for example, a vehicle such as a two-wheeled vehicle, a three-wheeled vehicle, or a four-wheeled vehicle. The power source of the vehicle M is an internal combustion engine such as a diesel engine or a gasoline engine, an electric motor, or a combination thereof. The electric motor operates by using power generated by a generator connected to the internal combustion engine or power discharged by a secondary battery or a fuel cell. The vehicle M is an example of "mobile object".

The vehicle M includes, for example, a camera 10, a radar device 12, a LIDAR (Light Detection and Ranging) device 14, an object recognition device 16, a communication device 20, an HMI (Human Machine Interface) 30, a vehicle sensor 40, a navigation device 50, a driver monitoring camera 60, a driving controller 70, a driving assistance device 100, a driving force output device 200, a braking device 210, and a steering device 220. These devices and instruments are connected to one another via, for example, a wireless communication line, a serial communication line, or a multiplex communication line such as a CAN (Controller Area Network) communication line. The configuration illustrated in FIG. 1 is only one example, and a part of the configuration may be omitted, or another configuration may be added thereto.

The camera 10 is, for example, a digital camera that uses a solid image pickup device such as a CCD (Charge Coupled Device) device or a CMOS (Complementary Metal Oxide Semiconductor) device. The camera 10 is mounted on any part of a vehicle (hereinafter referred to as "vehicle M") having the vehicle system 1 mounted thereon. When the camera 10 picks up a front image, the camera 10 is mounted on, for example, an upper part of a front windshield or a back surface of a rear-view mirror. The camera 10 repeatedly photographs the surroundings of the vehicle M periodically, for example. The camera 10 may be a stereo camera.

The radar device 12 radiates a radio wave such as a millimeter wave toward the surroundings of the vehicle M, and detects a radio wave (reflected wave) reflected by an object, to detect at least the position (distance and direction) of the object. The radar device 12 is mounted on any part of the vehicle M. The radar device 12 may detect the position and speed of the object by an FM-CW (Frequency Modulated Continuous Wave) method.

LIDAR 14 emits light (or electromagnetic wave with wavelength close to light) around the vehicle M and measures the scattered light. The LIDAR 14 detects a distance to the object based on the time from emission of light to reception of light. The emitted light is, for example, a pulsed laser light. The LIDAR 14 is mounted on any part of the vehicle M.

The object recognition device 16 executes sensor fusion processing for results of detection by the camera 10, the radar device 12, and the LIDAR 14, to thereby recognize a position, a type, and a speed of an object. The object recognition device 16 outputs the recognition result to the driving assistance device 100. The object recognition device 16 may output the results of detection by the camera 10, the radar device 12, and the LIDAR 14, to the driving assistance device 100 as it is. The object recognition device 16 may be omitted from the vehicle system 1.

The HMI 30 presents various kinds of information to the occupants of the vehicle M and accepts input operations by the occupants. The HMI 30 includes various display devices, speakers, buzzers, vibration generators (vibrators), touch panels, switches, keys, etc.

The vehicle sensor 40 includes a vehicle speed sensor that detects the speed of the vehicle M, an acceleration sensor that detects an acceleration, a yaw rate sensor that detects an angular speed around a vertical axis, an azimuth sensor that detects the orientation of the vehicle M, and other sensors.

The navigation device 50 includes, for example, a GNSS (Global Navigation Satellite System) receiver, a guidance control unit, and a storage unit storing map information. The GNSS receiver identifies the position of the vehicle M based on a signal received from a GNSS satellite. The position of the vehicle M may be identified or supplemented by an inertial navigation system (INS) using the output of the vehicle sensor 40. The guidance control unit, for example, determines the route from the position of the vehicle M identified by the GNSS receiver (or any input position) to the destination entered by the occupant by referring to the map information, and causes the HMI 30 to output guidance information so that the vehicle M travels along the route. The map information is, for example, information in which road geometry is represented by links indicating roads and nodes connected by the links. The map information may include road curvature and POI (Point Of Interest) information, etc. The navigation device 50 may transmit the current position and destination of the vehicle M to a navigation server via a communication device and obtain a route from the navigation server.

The driver monitoring camera 60 is, for example, a digital camera that uses a solid image pickup device such as a CCD (Charge Coupled Device) device or a CMOS (Complementary Metal Oxide Semiconductor) device. The driver monitoring camera 60 is mounted on any part of the vehicle M at a position and in an orientation that enable the head of an occupant seated in the driver's seat of the vehicle M (hereinafter referred to as "driver") to be photographed from the front (in an orientation that enables the face to be photographed). The driver monitoring camera 60 outputs, to the driving assistance device 100, the image obtained by photographing the cabin of the vehicle M including the driver from the position at which the driver monitoring camera 60 is placed.

Figure 2:
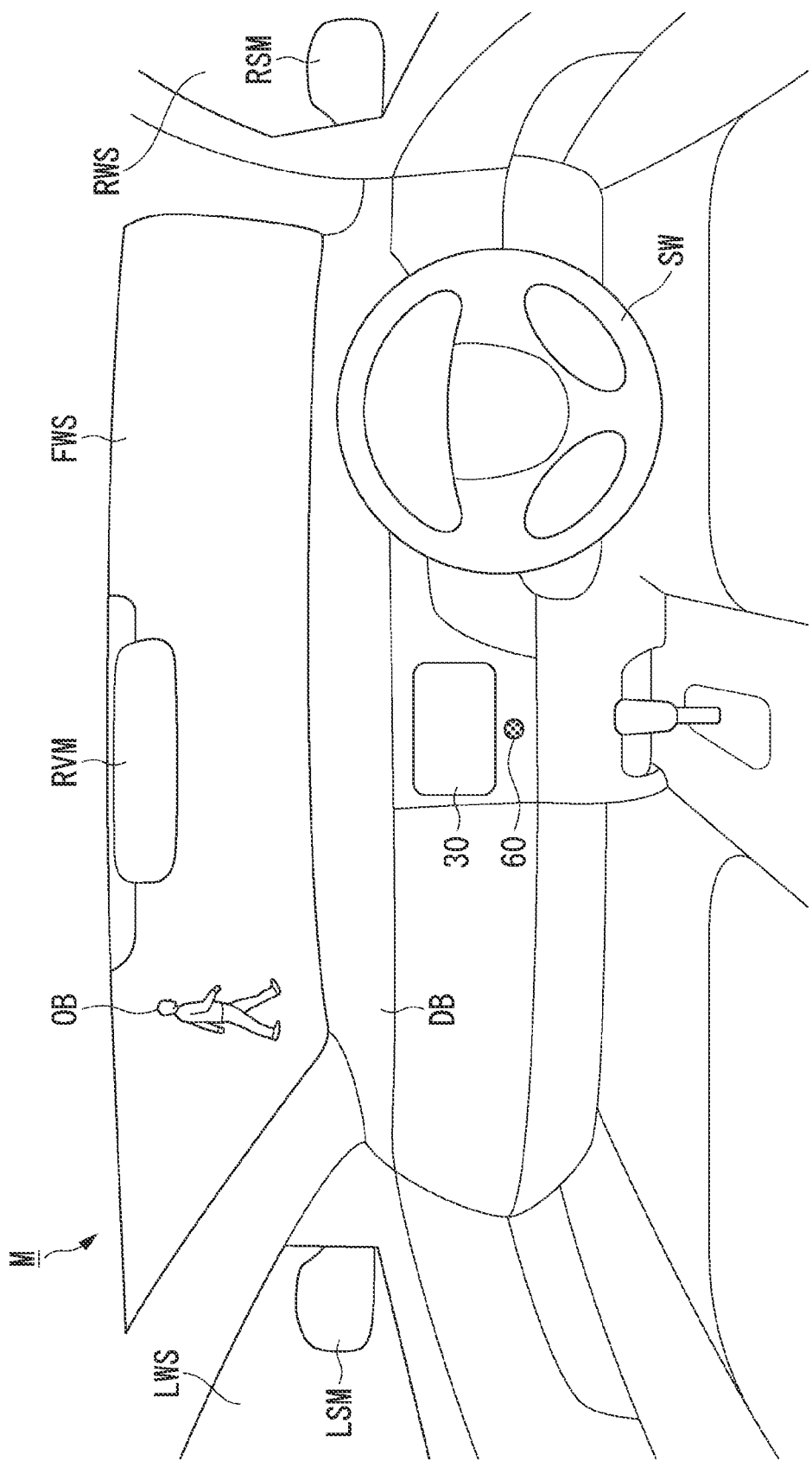
FIG. 2 is a diagram illustrating an exemplary position at which a driver monitoring camera is placed in the vehicle including the driving assistance device.

FIG. 2 is a diagram illustrating an exemplary position at which the driver monitoring camera 60 is placed in the vehicle M including the driving assistance device 100. In FIG. 2, RVM represents a rearview mirror, FWS represents a front windshield, LSM represents a left side view mirror, LWS represents a left windshield, RSM represents a right side view mirror, RWS represents a right windshield, DB represents a dashboard, SW represents a steering wheel, and OB represents an object (pedestrian) outside the vehicle recognized by the object recognition device 16. As illustrated in FIG. 2, the driver monitoring camera 60 is mounted on a lower side of the display device (HMI 30) provided at the center of the dashboard of the vehicle M, for example, and photographs the head of the driver from the front. The RVM rearview mirror, the front windshield FWS, the left side view mirror LSM, the left windshield LWS, the right side view mirror RSM, the right windshield RWS, the dash board DB, and the object OB are examples of "gaze candidate", and a gaze estimation unit 120 described later determines toward which one of the gaze candidates the driver is directing his or her gaze.

The driving controller 70 includes, for example, an acceleration pedal, a brake pedal, a shift lever, a steering wheel, and other controllers. A sensor for detecting the operation amount or whether or not an operation is performed is mounted to the driving controller 70, and the detection result is output to a part or all of the driving force output device 200, the braking device 210, and the steering device 220.

The driving force output device 200 outputs, to drive wheels, a driving force (torque) for causing the subject vehicle to travel. The driving force output device 200 includes, for example, a combination of an internal combustion engine, an electric motor, a transmission, and the like, and a ECU (Electronic Control Unit) for controlling these components. The ECU controls the above-mentioned components according to information input from the driving assistance device 100 or information input from the driving controller 70.

The braking device 210 includes, for example, a brake caliper, a cylinder for transmitting hydraulic pressure to the brake caliper, an electric motor for causing hydraulic pressure in the cylinder, and an ECU. The ECU controls the electric motor according to information input from the driving assistance device 100 or information input from the driving controller 70, and causes a brake torque that depends on a braking operation to be output to each wheel. The brake device 210 may be equipped with, as a backup, a mechanism that transmits the hydraulic pressure generated by the operation of the brake pedal included in the driving controller 70 to a cylinder via the master cylinder. The brake device 210 is not limited to have the above configurations, and may be an electronic control hydraulic brake device for controlling an actuator according to information input from the driving assistance device 100 and transmitting the hydraulic pressure of the master cylinder to the cylinder.

The steering device 220 includes, for example, a steering ECU and an electric motor. The electric motor applies a force to a rack and pinion mechanism to change the orientation of a steered wheel, for example. The steering ECU drives the electric motor to change the orientation of the steered wheel according to information input from the driving assistance device 100 or information input from the driving controller 70.

[Driving Assistance Device]

The driving assistance device 100 includes, for example, an object recognition unit 110, a gaze estimation unit 120, a gaze determination unit 130, and a driving assistance unit 140. These components are implemented by a hardware processor such as a CPU (Central Processing Unit) executing a program (software), for example. Further, a part or all of these components may be implemented by hardware (circuit unit including circuitry) such as an LSI (Large Scale Integration), an ASIC (Application Specific Integrated Circuit), an FPGA (Field-Programmable Gate Array), or a GPU (Graphics Processing Unit), or may be implemented through cooperation between software and hardware. The program may be stored in a storage device (storage device including non-transitory storage medium) such as an HDD or flash memory in advance, or may be stored in a removable storage medium such as a DVD or CD-ROM and the storage medium (non-transitory storage medium) may be attached to a drive device to install the program into the HDD or flash memory of the driving assistance device 100.

The object recognition unit 110 recognizes an object existing near the vehicle M based on the recognition results by the object recognition unit 16. The object recognition unit 110 may recognize any object existing near the vehicle M or may recognize only a moving object (risk object) existing near the vehicle M using, for example, the radar system 12 and/or the LIDAR 14.

The gaze estimation unit 120 uses the images output by the camera 10 and the driver monitoring camera 60 to estimate toward which gaze candidate the driver of the vehicle M is directing his or her gaze from among a plurality of gaze candidates including gaze candidates existing on a structure of the vehicle M and the object recognized by the object recognition unit 110.

Figure 3:
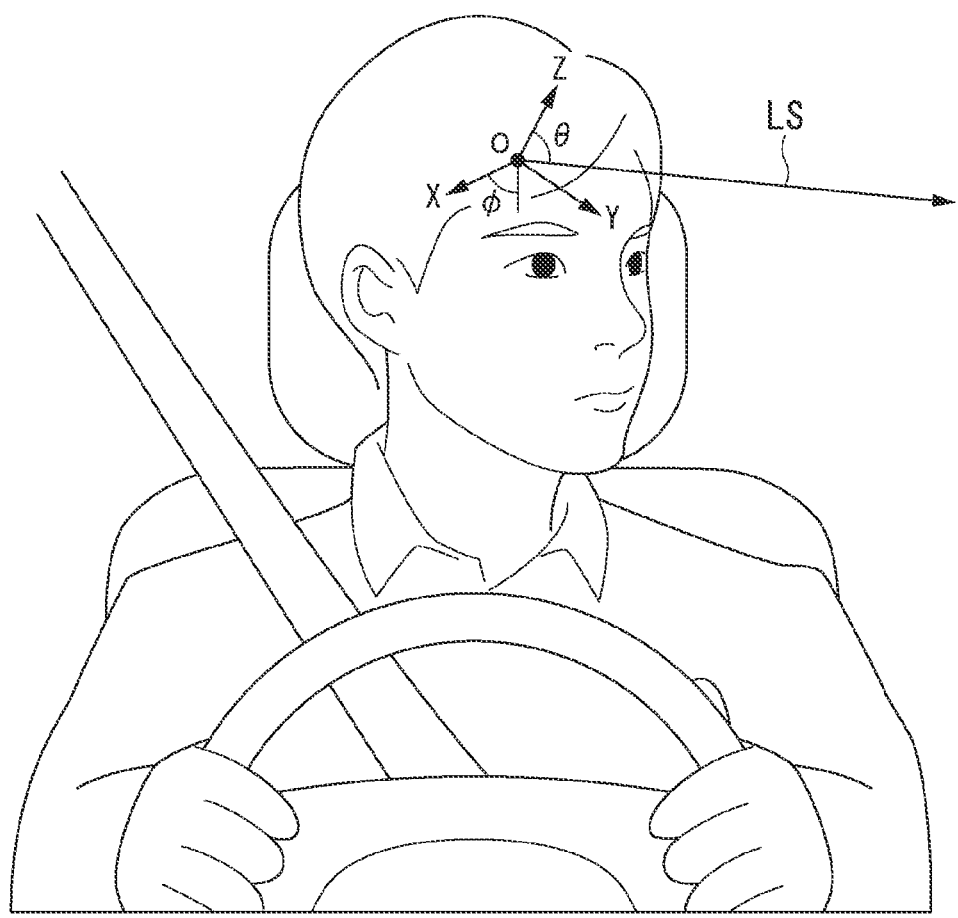
FIG. 3 is a diagram for describing a method of detecting the gaze of a driver by a gaze estimation unit.

FIG. 3 is a diagram for describing a method of detecting the gaze LS of the driver by the gaze estimation unit 120. The gaze estimation unit 120 first acquires an image including the driver of vehicle M photographed by the driver monitor camera 60, and then detects the gaze of the driver by any known algorithm (e.g., corneal reflection method). The gaze estimation unit 120 represents the detected gaze by polar coordinates with, for example, the driver's head as a center O. Alternatively, the gaze estimation unit 120 may represent the gaze by polar coordinates with, for example, the center O between the driver's eyebrows, or more generally, it suffices that the center O be set near the driver's eyes. In the following, the polar coordinates of the gaze LS detected by the gaze estimation unit 120 at a time t are represented by $s_t(\varphi_{s\_t}, \theta_{s\_t})$. Further, when the gaze estimation unit 120 has acquired an image including the object photographed by the camera 10, the gaze estimation unit 120 calculates the center angle and angle width of a plurality of gaze candidates including the object, which are represented by polar coordinates with the driver's head as the center O. As described above, the gaze candidate represents a candidate being gazed by the driver of the vehicle M, and includes, for example, the rearview mirror RVM, the front windshield FWS, the left side view mirror LSM, the left windshield LWS, the right side view mirror RSM, the right windshield RWS, the dash board DB, and the object OB.

Figure 4:
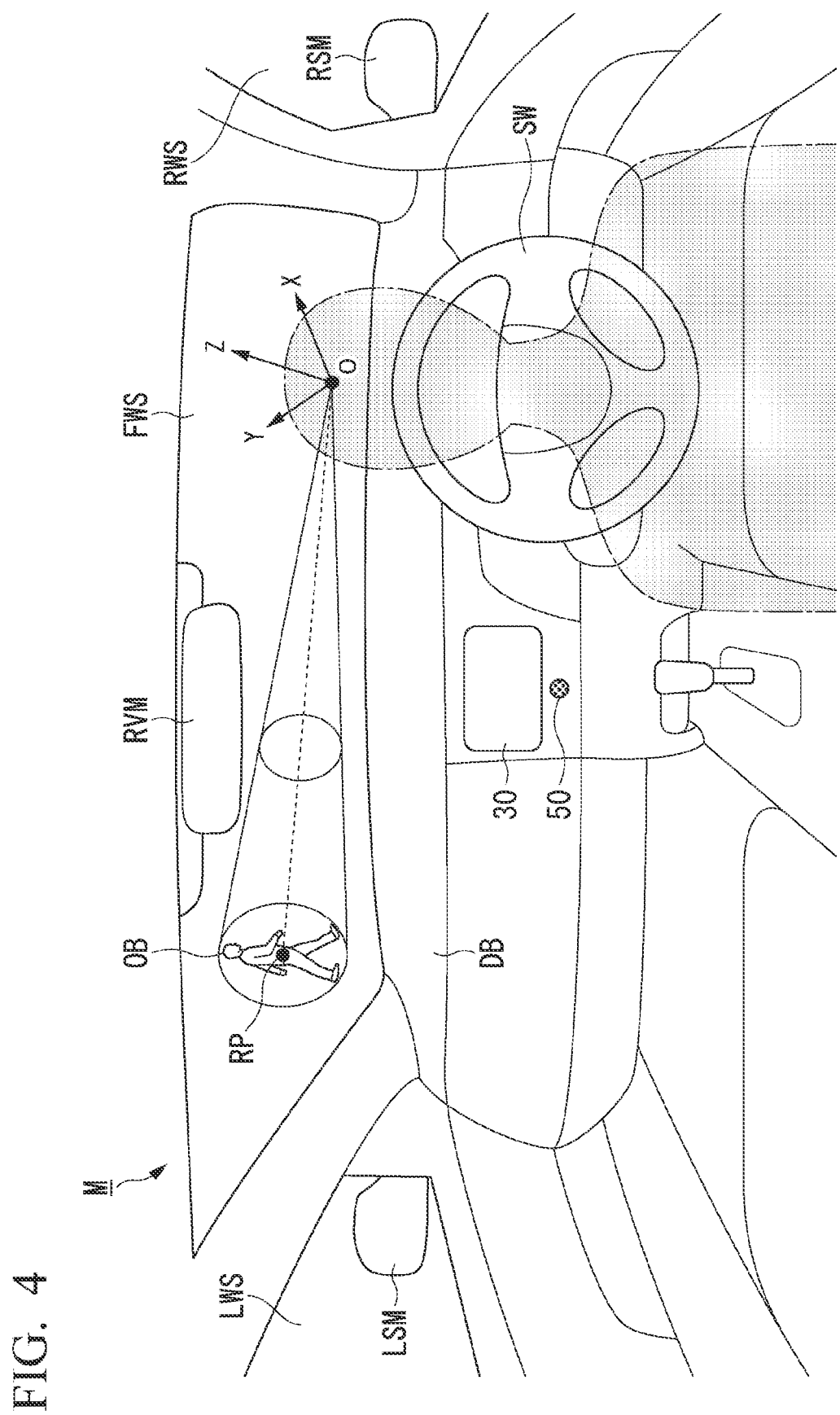
FIG. 4 is a diagram for describing a method of calculating a center angle and width of a gaze candidate by the gaze estimation unit.

FIG. 4 is a diagram for describing a method of calculating the center angle and width of the gaze candidate by the gaze estimation unit 120. As an example, FIG. 4 represents an example in which the gaze estimation unit 120 calculates the center angle and width of the object OB. In FIG. 4, RP represents a reference point (for example, point representing object OB such as center of gravity). The gaze estimation unit 120 calculates the reference point RP in polar coordinates. In the following, the polar coordinates of the reference point RP of an n-th gaze candidate calculated by the gaze estimation unit 120 at a time point t are represented as a center angle $(\varphi_{obj\_n,t}, \theta_{obj\_n,t})$. Further, the gaze estimation unit 120 calculates the width (in other words, extent of angle $(\varphi, \theta)$ of object OB in vertical and horizontal directions) of the angle of the object OB with respect to the center O. In the following, the polar coordinates of the width of the angle of an n-th gaze candidate calculated by the gaze estimation unit 120 at the time point t are represented as an angle width $(\Phi_{obj\_n,t}, \Theta_{obj\_n,t})$. $\Phi$ represents the angle width in the $\varphi$ direction, and $\Theta$ represents the angle width in the $\theta$ direction. The gaze estimation unit 120 calculates the center angle and angle width with respect to the center O also for the rearview mirror RVM, the front windshield FWS, the left side view mirror LSM, the left windshield LWS, the right side view mirror RSM, the right windshield RWS, and the dash board DB. However, the center angle and angle width for these gaze candidates having a fixed positional relationship from the driver's seat may be calculated and stored in advance.

After the gaze estimation unit 120 calculates the polar coordinates $s_t(\varphi_{s\_t}, \theta_{s\_t})$ of the gaze LS and the center angle $(\varphi_{obj\_n,t}, \theta_{obj\_n,t})$ and the angle width $(\Phi_{obj\_n,t}, \Theta_{obj\_n,t})$ for each gaze candidate at the time point t, the gaze estimation unit 120 inputs these values to a probability model represented by the following expression (1) to calculate a probability value of the driver directing his or her gaze toward each gaze candidate.

[Math. 1]

$$P(targ = n \mid s_{0:t}, obj_{1:N,0:t}) = \frac{p(s_t \mid targ = n, obj_{n,t})P(targ = n \mid s_{0:t-1}, obj_{1:N,0:t-1})}{p(s_t \mid s_{0:t-1}, obj_{1:N,0:t})} \quad (1)$$

The left side $P(targ=n \mid s_{0:t}, obj_{1:N,0:t})$ of the expression (1) represents a probability of the driver directing his or her gaze toward the n-th gaze candidate under the assumption of the polar coordinates of the gaze LS from the time point 0 to the time point t and the center angle and angle width of each of the first to N-th gaze candidates from the time point 0 to the time point t.

The right side $p(s_t \mid targ=n, obj_{n,t})$ of the expression (1) represents a probability density of the gaze $s_t$ on the assumption that the driver is directing his or her gaze toward an object n. When the gaze candidate is one from among the rearview mirror RVM, the front windshield FWS, the left side view mirror LSM, the left windshield LWS, the right side view mirror RSM, the right windshield RWS, and the dash board DB, the probability density $p(s_t \mid targ=n, obj_{n,t})$ of the driver directing his or her gaze toward the gaze candidate is defined by a uniform distribution. On the other hand, when the gaze candidate is the object OB, the probability density $p(s_t \mid targ=n, obj_{n,t})$ is defined by the following expression (2) representing a multivariate normal distribution.

[Math. 2]

$$p(s_t \mid targ = n, obj_{n,t}) = \frac{1}{2\pi\sigma_\varphi(\Phi_{obj_{n,t}})\sigma_\theta(\Theta_{obj_{n,t}})} \exp\left(-\frac{(\varphi_{s_t} - \varphi_{obj_{n,t}})^2}{2\sigma_\varphi(\Phi_{obj_{n,t}})^2} - \frac{(\theta_{s_t} - \theta_{obj_{n,t}})^2}{2\sigma_\theta(\Theta_{obj_{n,t}})^2}\right) \quad (2)$$

The expression (2) represents a normal distribution in which the center angle $(\varphi_{obj\_n,t}, \theta_{obj\_n,t})$ of the object OB is an average and the angle width $(\Phi_{obj\_n,t}, \Theta_{obj\_n,t})$ is a standard deviation. In other words, the expression (2) evaluates a higher probability value of the driver directing his or her gaze toward the object OB as the direction $s_t(\varphi_{s\_t}, \theta_{s\_t})$ of the gaze LS becomes closer to the center direction $(\varphi_{obj\_n,t}, \theta_{obj\_n,t})$ of the object OB. In the expression (2), the variances $\sigma_\varphi(\Phi_{obj\_n,t})$ and $\sigma_\theta(\Theta_{obj\_n,t})$ are defined by the following expressions (3) and (4) using parameters $\Phi_{base}$ and $\Theta_{base}$ defined as fixed values in advance.

[Math. 3]

$$\sigma_\varphi(\Phi_{obj_{n,t}}) = \Phi_{obj_{n,t}}/\Phi_{base} \quad (3)$$

[Math. 4]

$$\sigma_\theta(\Theta_{obj_{n,t}}) = \Theta_{obj_{n,t}}/\Theta_{base} \quad (4)$$

Further, in the right side of the expression (1), $P(targ=n \mid s_{0:t-1}, obj_{1:N,0:t-1})$ represents a previous probability of the driver directing his or her gaze toward the n-th gaze candidate, and an initial value thereof is a fixed value or designed in advance according to the number of objects existing near the vehicle M. In this manner, it is possible to calculate the current probability value in a robust manner in consideration of the previous probability value by multiplying the previous probability value $P(targ=n \mid s_{0:t-1}, obj_{1:N,0:t-1})$ by the probability density $p(s_t \mid targ=n, obj_{n,t})$. Further, in the right side of the expression (1), $p(s_t \mid s_{0:t-1}, obj_{1:N,0:t})$ represents a normalization parameter for adjusting the probability value, and is defined so as to satisfy the following expression (5).

[Math. 5]

$$\sum_{n=1}^{N} P(targ = n \mid s_{0:t}, obj_{1:N,0:t}) = 1 \quad (5)$$

Figure 5:
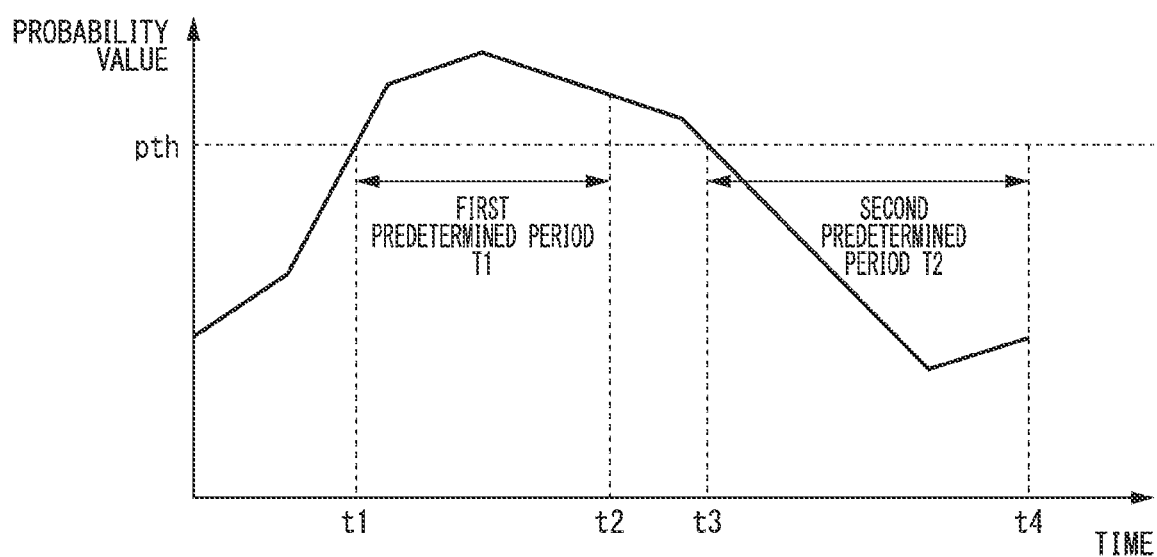
FIG. 5 is a diagram for describing a method of determining that the driver has visually recognized a gaze candidate by a gaze determination unit.

When the gaze determination unit 130 has estimated that the driver is directing his or her gaze toward one of the plurality of gaze candidates for the first predetermined period or more, the gaze determination unit 130 determines that the driver visually recognizes the gaze candidate. FIG. 5 is a diagram for describing a method of determining that the driver visually recognizes a gaze candidate by the gaze determination unit 130. As illustrated in FIG. 5, the gaze determination unit 130 first recognizes that the probability value corresponding to a gaze candidate is equal to or larger than a threshold value $p_{th}$ at a time point t1. After that, when the probability value is equal to or larger than the threshold value $p_{th}$ until a time point t2 after elapse of a first predetermined period T1 since the time point t1, the gaze determination unit 130 determines that the driver visually recognizes the gaze candidate. After that, the probability value is equal to or larger than the threshold value $p_{th}$ until the time point t3, and thus the gaze determination unit 130 determines that the driver visually recognizes the gaze candidate continuously.

After that, the time point t3 ha passed, and the probability value becomes smaller than the threshold value $p_{th}$. However, even when the probability value has become smaller than the threshold value $p_{th}$, the gaze determination unit 130 keeps a determination result indicating that the driver visually recognizes the gaze candidate for a second predetermined period T2. This is because when the driver has directed his or her gaze toward a gaze candidate for at least the first predetermined period T1, even after the driver has turned his or her gaze away from the gaze candidate, the driver is estimated to recognize the state of the gaze candidate for a certain period. In this manner, by keeping the determination result for a fixed period even after the driver has turned his or her gaze away from a gaze candidate, the driving assistance unit 140 described later can execute driving assistance according to actual recognition by the driver. More specifically, by keeping the determination result for a fixed period, the driving assistance unit 140 can provide driving assistance that has reduced a deviation between actual recognition by the driver and the level of driving assistance and unnecessary warning by driving assistance due to the deviation.

The gaze determination unit 130 may change the lengths of the first predetermined period and the second predetermined period to be used for determining visual recognition according to the type of the gaze candidate. For example, the gaze determination unit 130 may decrease the first predetermined period or increase the second predetermined period when the gaze candidate is used for checking the front side or lateral side of the vehicle M as in the case of the front windshield FWS, the left windshield LWS, the right windshield RWS, and the dash board DB compared with when the gaze candidate is used for checking the back side of the vehicle M as in the case of the rearview mirror RVM, the left side view mirror LSM, and the right side view mirror RSM.

Further, for example, the gaze determination unit 130 may increase the second predetermined period as the period in which the driving is directing his or her gaze toward a gaze candidate, that is, the period (period between time point t1 and time point t3 in FIG. 5) in which the probability value is equal to or larger than the threshold value $p_{th}$ becomes longer. Further, for example, the gaze determination unit 130 may integrate the probability value (or difference between probability value and threshold value $p_{th}$) over a period in which the probability value is equal to or larger than the threshold value $p_{th}$, and increase the second predetermined period as the integrated value becomes larger.

Further, for example, the gaze determination unit 130 may increase the second predetermined period as the number (number of times) of objects visually recognized by the driver becomes larger among a plurality of objects recognized by the object recognition unit 110 in the past within a fixed period. In this case, the gaze determination unit 130 may further increase the second predetermined period as the risk of an object visually recognized by the driver becomes higher among the plurality of objects recognized by the object recognition unit 110 in the past within a fixed period. For example, the gaze determination unit 130 may calculate a TTC (time to collision) between the vehicle M and an object, and increase the second predetermined period by determining the risk of a visually recognized object to be higher as the TTC between the vehicle M and the object visually recognized by the driver becomes smaller.

Figure 6:
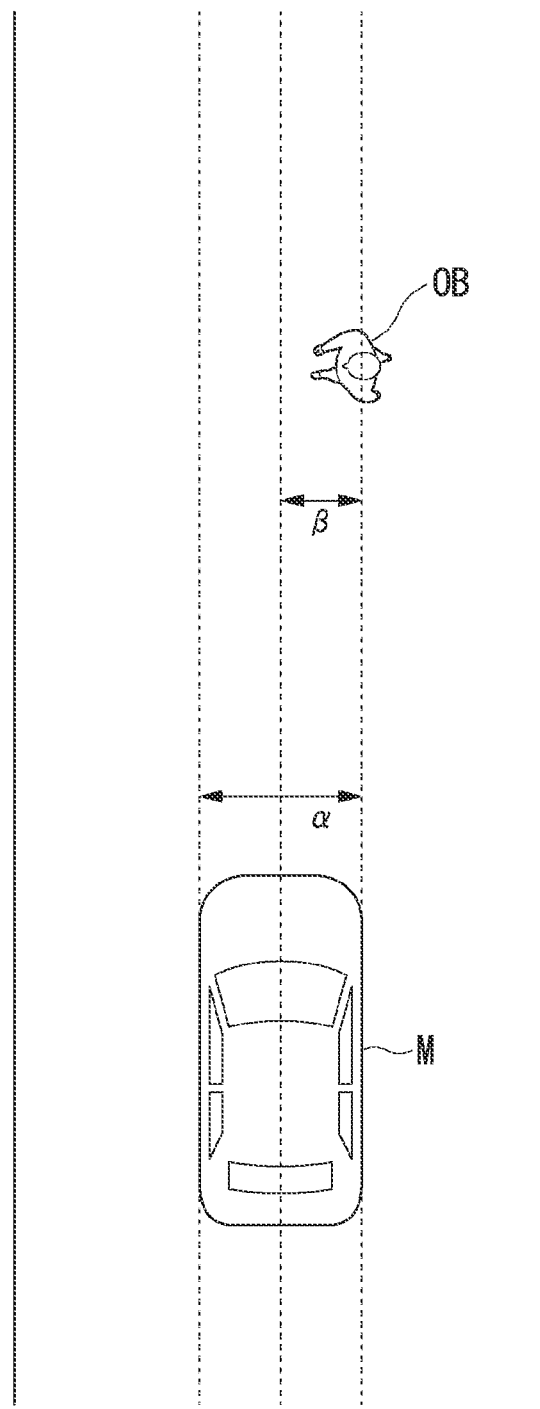
FIG. 6 is a diagram for describing a method of calculating a second predetermined period in consideration of a lap ratio by the gaze determination unit.

Further, for example, the gaze determination unit 130 may calculate a lap ratio between the vehicle M and an object, and increase the second predetermined period by determining the risk of a visually recognized object to be higher as the lap ratio between the vehicle M and the object visually recognized by the driver becomes larger. FIG. 6 is a diagram for describing a method of calculating the second predetermined period in consideration of the lap ratio by the gaze determination unit 130. For example, the gaze determination unit 130 calculates, as a lap amount β, the overlapping amount (distance in vehicle width direction in the example of FIG. 6) between a region obtained by extending the width α of the vehicle M in the travel direction and a region of a pedestrian serving as the object OB. The gaze determination unit 130 multiplies the division of the lap amount β by the vehicle width α by 100 ((β/α)×100) to obtain the lap ratio [%]. The gaze determination unit 130 may increase the second predetermined period by determining the risk of a visually recognized object to be higher as the lap ratio between the vehicle M and the object visually recognized by the driver becomes larger. With this processing, it is possible to determine a period in which to keep the determination result according to actual recognition by the driver.

The driving assistance unit 140 executes driving assistance for the vehicle M on the basis of the result of determination by the gaze determination unit 130. More specifically, the driving assistance unit 140 executes driving assistance so as to reduce the degree of alertness for an object when the gaze determination unit 130 has determined that the driver visually recognizes a gaze candidate, and visual recognition of the gaze candidate enables recognition of the object included in the gaze candidate.

Figure 7:
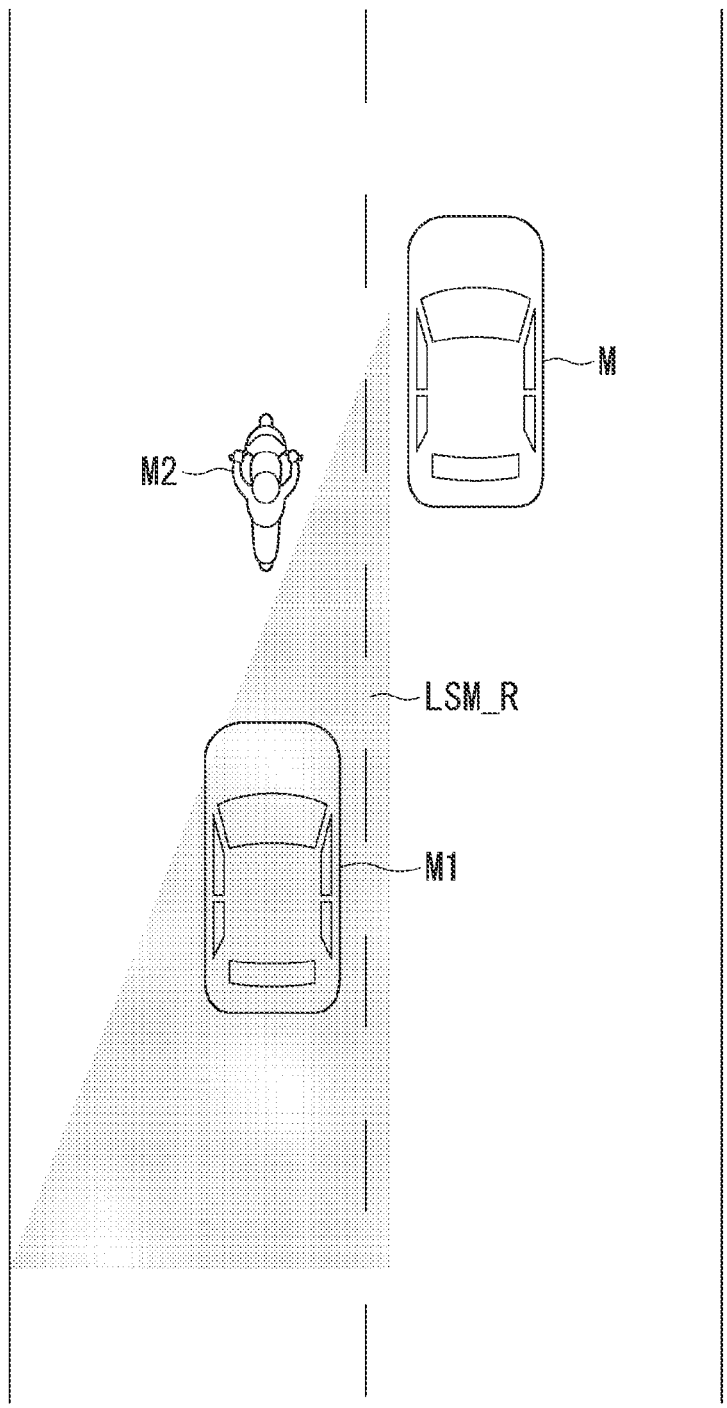
FIG. 7 is a diagram for describing driving assistance to be executed by a driving assistance unit.

FIG. 7 is a diagram for describing driving assistance to be executed by the driving assistance unit 140. FIG. 7 shows, as an example, a scene in which the driving assistance unit 140 executes driving assistance in a situation in which the driver visually recognizes the left side view mirror LSM. In FIG. 7, the reference symbols M1 and M2 represent other vehicles, and the reference symbol LSM_R represents a range of objects that can be recognized by visually recognizing the left side view mirror LSM. The recognition range LSM_R includes another vehicle M1 but does not include another vehicle M2. In other words, it is expected that the driver recognizes another vehicle M1 by visually recognizing the left side view mirror LSM, whereas the driver does not recognize another vehicle M2.

Figure 8:
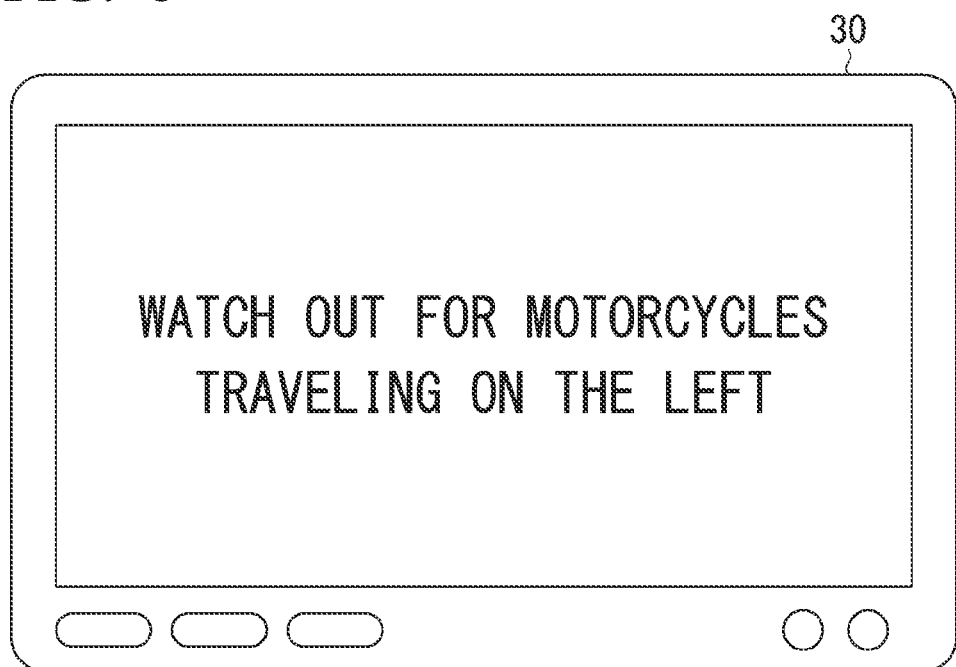
FIG. 8 is a diagram for describing driving assistance to be executed by the driving assistance unit.

Thus, the driving assistance unit 140 executes driving assistance so as to reduce the degree of alertness for another vehicle M1 (increase the degree of alertness for another vehicle M2). FIG. 8 is a diagram for describing driving assistance to be executed by the driving assistance unit 140. As illustrated in FIG. 8, the driving assistance unit 140 displays, on the HMI 30, a message for suggesting to drive the vehicle M while watching out for another vehicle M2 (motorcycle) not included in the recognition range LSM_R. Further, for example, the driving assistance unit 140 may cause the speaker to output a message for suggesting to drive the vehicle M while watching out for another vehicle M2. Further, for example, the driving assistance unit 140 may output a command value to the steering device 220 so as to drive the vehicle M away from another vehicle M2 not included in the recognition range LSM_R. In this manner, it is possible to execute driving assistance according to actual recognition of the driver by decreasing the degree of alertness of driving assistance only for an object included in a range recognized by visually recognizing a gaze candidate.

[Flow of Operations]

Figure 9:
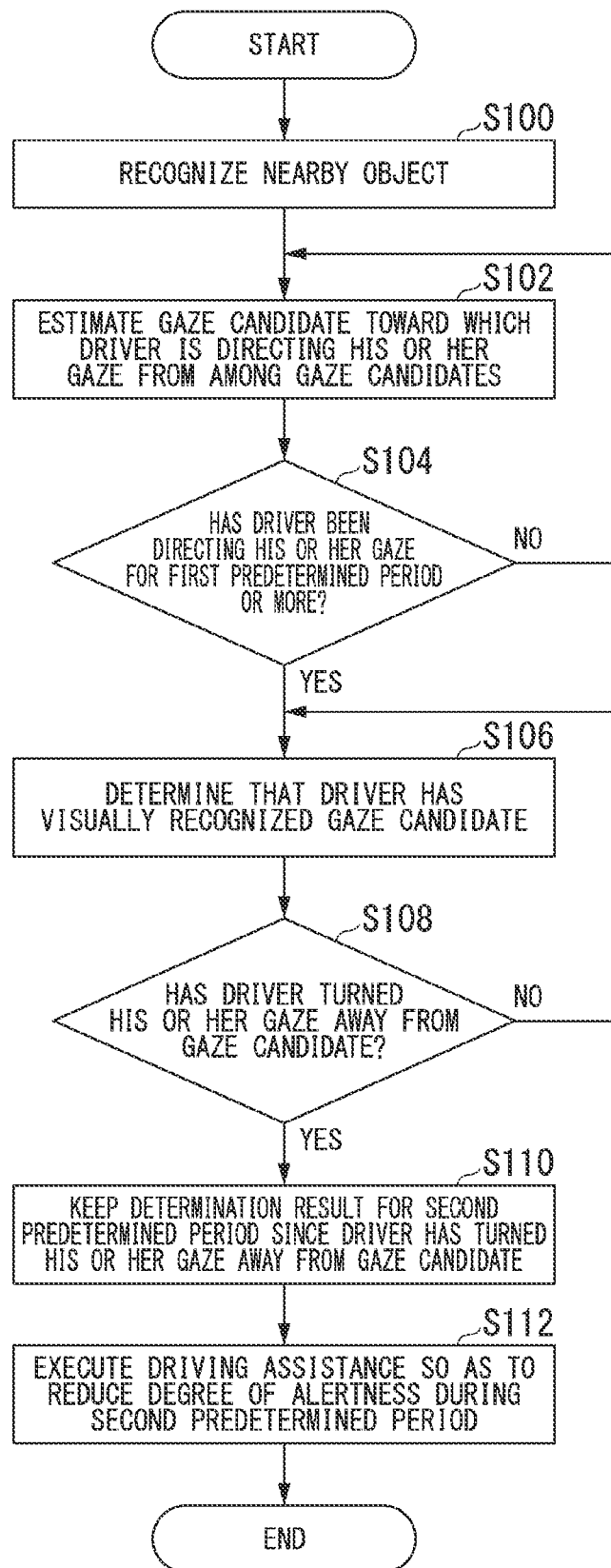
FIG. 9 is a flow chart illustrating an exemplary flow of operations to be executed by the driving assistance device.

Next, description is given of a flow of operations to be executed by the driving assistance device 100 with reference to FIG. 9. FIG. 9 is a flow chart illustrating an exemplary flow of operations to be executed by the driving assistance device 100. The processing of the flow chart illustrated in FIG. 9 is repeatedly executed by the driving assistance device 100 in specific control cycles during traveling of the vehicle M.

First, the object recognition unit 110 recognizes an object existing near the vehicle M on the basis of the result of recognition by the object recognition unit 16 (Step S100). Next, the gaze estimation unit 120 calculates, for each of a plurality gaze candidates including the recognized object, a probability value of the driver directing his or her gaze toward the gaze candidate, and estimates a gaze candidate for which the calculated probability value is equal to or larger than the threshold value $p_{th}$ as the gaze candidate toward which the driver is directing his or her gaze (Step S102).

Next, the gaze determination unit 130 determines, for the gaze candidate toward which the driver is estimated to be directing his or her gaze by the gaze estimation unit 120, whether or not the period in which the calculated probability value is equal to or larger than the threshold value $p_{th}$ is equal to or longer than the first predetermined period T1 (Step S104). When it is determined that the period in which the calculated probability value is equal to or larger than the threshold value $p_{th}$ is shorter than the first predetermined period T1, the gaze determination unit 130 returns the processing to Step S102, and the gaze determination unit 130 estimates a gaze candidate toward which the driver is directing his or her gaze again.

On the other hand, when it is determined that the period in which the calculated probability value is equal to or larger than the threshold value $p_{th}$ is equal to or longer than the first predetermined period T1, the gaze determination unit 130 determines that the driver visually recognizes the gaze candidate (Step S106). Next, the gaze determination unit 130 determines whether or not the driver has turned his or her gaze away from the gaze candidate (in other words, whether or not the probability value becomes smaller than the threshold value $p_{th}$) (Step S108). When it is determined that the driver has not turned his or her gaze away from the gaze candidate, the gaze determination unit 130 returns the processing to Step S106, and the gaze determination unit 130 determines that the driver visually recognizes the gaze candidate continuously.

When it is determined that the driver has turned his or her gaze away from the gaze candidate, the gaze determination unit 130 keeps the determination result indicating that the driver visually recognizes the gaze candidate for the second predetermined period T2 since the driver has turned his or her gaze away from the gaze candidate (Step S110). Next, the driving assistance unit 140 executes driving assistance for the vehicle M so as to reduce the degree of alertness for the gaze candidate (more specifically, the degree of alertness for an object included in the range recognized by visually recognizing the gaze candidate) during the second predetermined period T2 (Step S112). In this manner, the processing of this flow chart is finished.

According to the embodiment described above, the driving assistance device recognizes an external object near a mobile object, estimates toward which gaze candidate an occupant of the mobile object is directing his or her gaze from among a plurality of gaze candidates including the recognized external object, determines that the occupant visually recognizes a gaze candidate when the occupant is estimated to direct his or her gaze toward the gaze candidate for a first predetermined period or more, keeps the determination result indicating that the occupant visually recognizes the gaze candidate for a second predetermined period since the occupant has turned his or her gaze away from the gaze candidate, and executes driving assistance for the mobile object so as to reduce the degree of alertness for the gaze candidate determined to be visually recognized by the occupant. With this, it is possible to flexibly execute driving assistance according to the direction or period of gaze of the occupant of a mobile object.

The embodiment described above can be represented in the following manner.

Provided is a gaze estimation device for estimating toward which gaze candidate an occupant of a mobile object is directing his or her gaze from among a plurality of gaze candidates including gaze candidates existing on a structure of the mobile object and an object near the mobile object, the gaze estimation device including a storage medium storing computer-readable commands and a processor connected to the storage medium, the processor executing the computer-readable commands to: calculate, for each of the plurality of gaze candidates, a probability value of the occupant directing his or her gaze toward the gaze candidate based on the gaze and a probability distribution representing probabilities of directing his or her gaze toward each of the plurality of gaze candidates; and estimate that the occupant is directing his or her gaze toward a gaze candidate for which the probability value is equal to or larger than a threshold value among the plurality of gaze candidates.

This concludes the description of the embodiment for carrying out the present invention. The present invention is not limited to the embodiment in any manner, and various kinds of modifications and replacements can be made within a range that does not depart from the gist of the present invention.

What is claimed is:

1. A gaze estimation device for estimating toward which gaze candidate an occupant of a mobile object is directing his or her gaze from among a plurality of gaze candidates including gaze candidates existing on a structure of the mobile object and an object near the mobile object, the gaze estimation device comprising a non-transitory storage medium storing computer-readable commands and a processor connected to the storage medium, the processor executing the computer-readable commands to:
   calculate, for each of the plurality of gaze candidates, a probability value of the occupant directing his or her gaze toward the gaze candidate based on the gaze and a probability distribution representing probabilities of directing his or her gaze toward each of the plurality of gaze candidates; and
   estimate that the occupant is directing his or her gaze toward a gaze candidate for which the probability value is equal to or larger than a threshold value among the plurality of gaze candidates,
   wherein the processor repeatedly calculates, for each of the plurality of gaze candidates, the probability value at a plurality of time points, and calculates the probability value at a calculation time point based on the probability value at a previous time point and a probability value of the gaze on the assumption that a driver is directing his or her gaze toward the gaze candidate, the probability value of the gaze being calculated by inputting coordinates of the gaze to the probability distribution.

2. The gaze estimation device according to claim 1, wherein the processor calculates the probability value based on the gaze, which is represented by polar coordinates centered around a head of the occupant of the mobile object, and a center angle and angle width of the gaze candidate represented by polar coordinates centered around the head.

3. The gaze estimation device according to claim 1, wherein the processor calculates the probability value based on the different probability distributions set according to the types of the plurality of gaze candidates.

4. A gaze estimation method for estimating toward which gaze candidate an occupant of a mobile object is directing his or her gaze from among a plurality of gaze candidates including gaze candidates existing on a structure of the mobile object and an object near the mobile object, the gaze estimation method causing a computer to:
   calculate, for each of the plurality of gaze candidates, a probability value of the occupant directing his or her gaze toward the gaze candidate based on the gaze and a probability distribution representing probabilities of directing his or her gaze toward each of the plurality of gaze candidates;
   estimate that the occupant is directing his or her gaze toward a gaze candidate for which the probability value is equal to or larger than a threshold value among the plurality of gaze candidates; and execute driving assistance in such a manner as to reduce a degree of alertness for the gaze candidate for which the probability value is equal to or larger than a threshold value, wherein the computer repeatedly calculates, for each of the plurality of gaze candidates, the probability value at a plurality of time points, and calculates the probability value at a calculation time point based on the probability value at a previous time point and a probability value of the gaze on the assumption that the driver is directing his or her gaze toward the gaze candidate, the probability value of the gaze being calculated by inputting coordinates of the gaze to the probability distribution.

5. A non-transitory computer-readable storage medium storing a program for estimating toward which gaze candidate an occupant of a mobile object is directing his or her gaze from among a plurality of gaze candidates including gaze candidates existing on a structure of the mobile object and an object near the mobile object, the program causing a computer to:

calculate, for each of the plurality of gaze candidates, a probability value of the occupant directing his or her gaze toward the gaze candidate based on the gaze and a probability distribution representing probabilities of directing his or her gaze toward each of the plurality of gaze candidates; and estimate that the occupant is directing his or her gaze toward a gaze candidate for which the probability value is equal to or larger than a threshold value among the plurality of gaze candidates, wherein the computer repeatedly calculates, for each of the plurality of gaze candidates, the probability value at a plurality of time points, and calculates the probability value at a calculation time point based on the probability value at a previous time point and a probability value of the gaze on the assumption that the driver is directing his or her gaze toward the gaze candidate, the probability value of the gaze being calculated by inputting coordinates of the gaze to the probability distribution.

* * * * *